(12) United States Patent
Hazeyama et al.

(10) Patent No.: US 9,539,909 B2
(45) Date of Patent: Jan. 10, 2017

(54) INVERTER-INTEGRATED DRIVING MODULE AND MANUFACTURING METHOD THEREFOR

(75) Inventors: Moriyuki Hazeyama, Tokyo (JP); Yoshihiro Miyama, Tokyo (JP); Masaya Inoue, Tokyo (JP); Yoshiko Obiraki, Tokyo (JP); Tatsuya Kitamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 509 days.

(21) Appl. No.: 13/519,747

(22) PCT Filed: Jan. 20, 2011

(86) PCT No.: PCT/JP2011/050954
§ 371 (c)(1),
(2), (4) Date: Jun. 28, 2012

(87) PCT Pub. No.: WO2011/093202
PCT Pub. Date: Aug. 4, 2011

(65) Prior Publication Data
US 2012/0319542 A1    Dec. 20, 2012

(30) Foreign Application Priority Data

Jan. 29, 2010 (JP) .................................. 2010-018085
Sep. 30, 2010 (JP) .................................. 2010-221431

(51) Int. Cl.
*H02K 11/00* (2016.01)
*B60L 11/18* (2006.01)
*H02K 11/02* (2016.01)

(52) U.S. Cl.
CPC ............ *B60L 11/1803* (2013.01); *H02K 11/02* (2013.01); *H02K 11/33* (2016.01); *B60L 2200/26* (2013.01);
(Continued)

(58) Field of Classification Search
CPC ............ H02K 11/0068; H02K 11/0073; H02K 11/02–11/0024; H02K 11/30–11/38
(Continued)

(56) References Cited

U.S. PATENT DOCUMENTS 5,804,904 A * 9/1998 Park et al. ............. 310/216.074
5,929,549 A * 7/1999 Trago et al. .................. 310/198
(Continued)

FOREIGN PATENT DOCUMENTS

CN        1592034 A      3/2005
CN      101197546 A      6/2008
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*
(Continued)

*Primary Examiner* — Thomas Truong
(74) *Attorney, Agent, or Firm* — Oblon, McClelland, Maier & Neustadt, L.L.P.

(57) ABSTRACT

Phase coils are each configured by winding a conductor wire in a concentrated winding consecutively on three circumferentially consecutive tooth portions, six inverter units of an inverter module are each disposed in close proximity to a motor so as to face each of the phase coils axially, and the motor and the inverter module are electrically connected by connecting an alternating-current output terminals of each of the plurality of inverter units to output wires of the phase coils that face the inverter units axially.

4 Claims, 9 Drawing Sheets

(52) U.S. Cl.
CPC ........... *Y02T 10/641* (2013.01); *Y02T 10/7005* (2013.01); *Y10T 29/49009* (2015.01)

(58) Field of Classification Search
USPC ................ 310/68 D, 68 A, 68 B, 68 E, 68 R
See application file for complete search history.

(56) References Cited

U.S. PATENT DOCUMENTS

| | | | |
|---|---|---|---|
| 6,111,390 A * | 8/2000 | Inaba et al. | 322/28 |
| 7,312,545 B2 * | 12/2007 | Sasaki et al. | 310/68 R |
| 2005/0258690 A1 * | 11/2005 | Kusumi | 310/68 D |
| 2007/0182271 A1 | 8/2007 | Sugishima et al. | |
| 2008/0136265 A1 * | 6/2008 | Mizukoshi et al. | 307/89 |
| 2009/0085446 A1 * | 4/2009 | Yagi | 310/68 D |

FOREIGN PATENT DOCUMENTS

| | | | | |
|---|---|---|---|---|
| DE | 10 2008 035 233 A1 | 2/2009 | | |
| EP | 1372247 A1 * | 12/2003 | ............. | H02K 11/04 |
| JP | 2001 186736 | 7/2001 | | |
| JP | 2004055831 A * | 2/2004 | ............. | H01L 23/48 |
| JP | 2005 143151 | 6/2005 | | |
| JP | 2007 116840 | 5/2007 | | |
| JP | 2007116840 A * | 5/2007 | | |
| JP | 2007 215272 | 8/2007 | | |
| JP | 2008 131794 | 6/2008 | | |
| JP | 2008-167641 A | 7/2008 | | |
| JP | 2009 291040 | 12/2009 | | |

OTHER PUBLICATIONS

Machine Translation, Matthias et al., EP 1372247 A1, Dec. 17, 2003.*
Machine Translation, Motoda et al., JP 2004055831 A, Feb. 19, 2004.*
Machine Translation, Nakanishi, JP 2007116840 A, May 10, 2007.*
International Search Report Issued Mar. 1, 2011 in PCT/JP11/50954 Filed Jan. 20, 2011.
Office Action issued Mar. 17, 2014 in German Patent Application No. 11 2011 100 373.0 (with English language translation).
Chinese Office Action issued Nov. 14, 2014, in Chinese Patent Application No. 201180007339.9 (with English translation).

* cited by examiner

INVERTER-INTEGRATED DRIVING MODULE AND MANUFACTURING METHOD THEREFOR

TECHNICAL FIELD

The present invention relates to a driving module in which an inverter is internally mounted and to a manufacturing method therefor.

BACKGROUND ART

In conventional power module-integrated motors, a power module is inserted into and fixed to a power module mount portion that is formed by cutting away a stator axially such that power terminals and controlling terminals project externally, the power terminals are connected to a motor winding, the controlling terminals are connected to an external controlling circuit, and a rotor core is configured so as to rotate by means of switching of the power module by sending signals from the external controlling circuit (see Patent Literature 1, for example).

CITATION LIST

Patent Literature

Patent Literature 1: Japanese Patent Laid-Open No. 2004-236470 (Gazette)

SUMMARY OF THE INVENTION

Problem to be Solved by the Invention

However, in conventional power module-integrated motors, because respective output wires of the motor winding are led around an end surface of the stator to be connected to the power terminals of the power module that is inserted into and fixed to the power module mount portion that is formed by cutting away the radially outer side of the stator axially, one disadvantage has been that wiring length between the power module and the motor is increased, increasing copper loss due to the wiring in question.

In conventional power module-integrated motors, the motor winding includes twelve phase coils that are wound into concentrated windings on each of the tooth portions, and although the arrangement of the twelve phase coils is not described at all, the twelve phase coils are generally arranged so as to line up in order of a U phase, a V phase, a W phase, a U phase, a V phase, etc., through a V phase, and a W phase.

Now, if the motor winding is constituted by two three-phase alternating current windings, then the U-phase coils that constitute each of the three-phase alternating-current windings are configured by connecting two U-phase phase coils in series, the V-phase coils are configured by connecting two V-phase phase coils in series, and the W-phase coils are configured by connecting the two W-phase phase coils in series. Thus, because the number of connections between the phase coils is extremely large, another disadvantage has been that complicated connecting work is increased, giving rise to cost increases.

The present invention aims to solve the above problems and an object of the present invention is to provide an inverter-integrated driving module and a manufacturing method therefor that can reduce copper loss by configuring phase coils by winding a conductor wire into concentrated windings consecutively on a plurality of circumferentially consecutive tooth portions, and by disposing inverter units so as to face the phase coils axially in close proximity, to reduce the number of connections between the phase coils and also to shorten wiring length between an inverter module and a motor.

Means for Solving the Problem

In order to achieve the above object, according to one aspect of the present invention, there is provided an inverter-integrated driving module including: a motor including: a stator in which a stator coil that is constituted by M phase coils (where M is an integer that is greater than or equal to 3) is mounted into an annular stator core; and a rotor that has magnetic poles in which North-seeking (N) poles and South-seeking (S) poles are arranged so as to alternate circumferentially; and an inverter module that includes a plurality of inverter units each including: a positive electrode-side input terminal; a negative electrode-side input terminal; an upper arm switching element of which a positive-electrode side is connected to the positive electrode-side input terminal; a lower arm switching element of which a negative-electrode side is connected to the negative electrode-side input terminal; and an alternating-current output terminal that is connected to a negative-electrode side of the upper arm switching element and a positive-electrode side of the lower arm switching element. Each of the M phase coils is configured into a concentrated winding coil in which a conductor wire is wound into a concentrated winding consecutively on L circumferentially consecutive tooth portions (where L is an integer that is greater than or equal to 2), each of the plurality of inverter units of the inverter module is disposed in close proximity to the motor so as to face each of the M phase coils axially, and the motor and the inverter module are electrically connected by connecting the alternating-current output terminals of each of the plurality of inverter units to output wires of the phase coils that face the inverter units axially.

Effects of the Invention

According to the present invention, because each of the M phase coils is configured into a concentrated winding coil in which a conductor wire is wound into a concentrated winding consecutively on L circumferentially consecutive tooth portions (where L is an integer that is greater than or equal to 2), the number of connections between the phase coils is reduced, reducing complicated connecting work between the phase coils, and enabling costs to be reduced.

Because the inverter module is disposed in close proximity to the motor such that each of a plurality of inverter units faces each of the M phase coils axially, lengths of wiring between the inverter module and the motor are shortened, enabling copper loss to be reduced.

DESCRIPTION OF EMBODIMENTS

Preferred embodiments of an inverter-integrated driving module according to the present invention will now be explained using the drawings.

Embodiment 1

Figure 1:
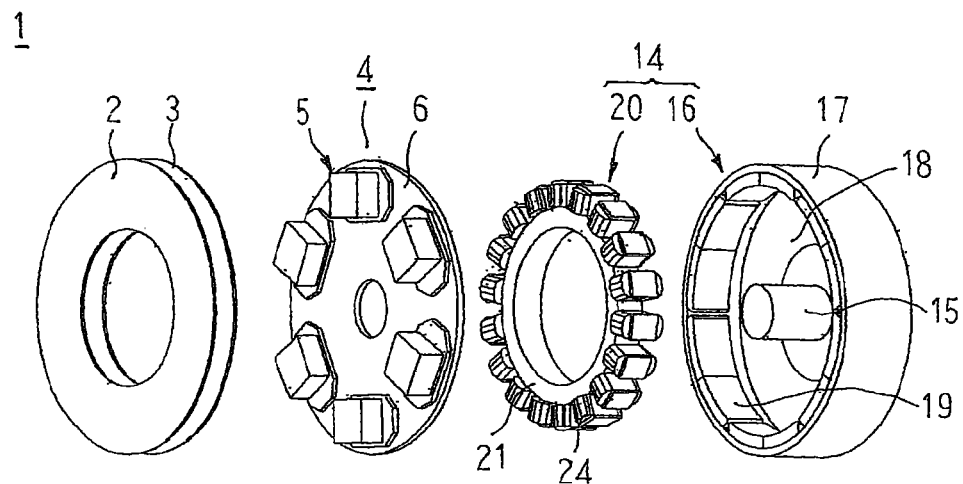
FIG. 1 It is an exploded perspective that shows an inverter-integrated driving module according to Embodiment 1 of the present invention.
Figure 2:
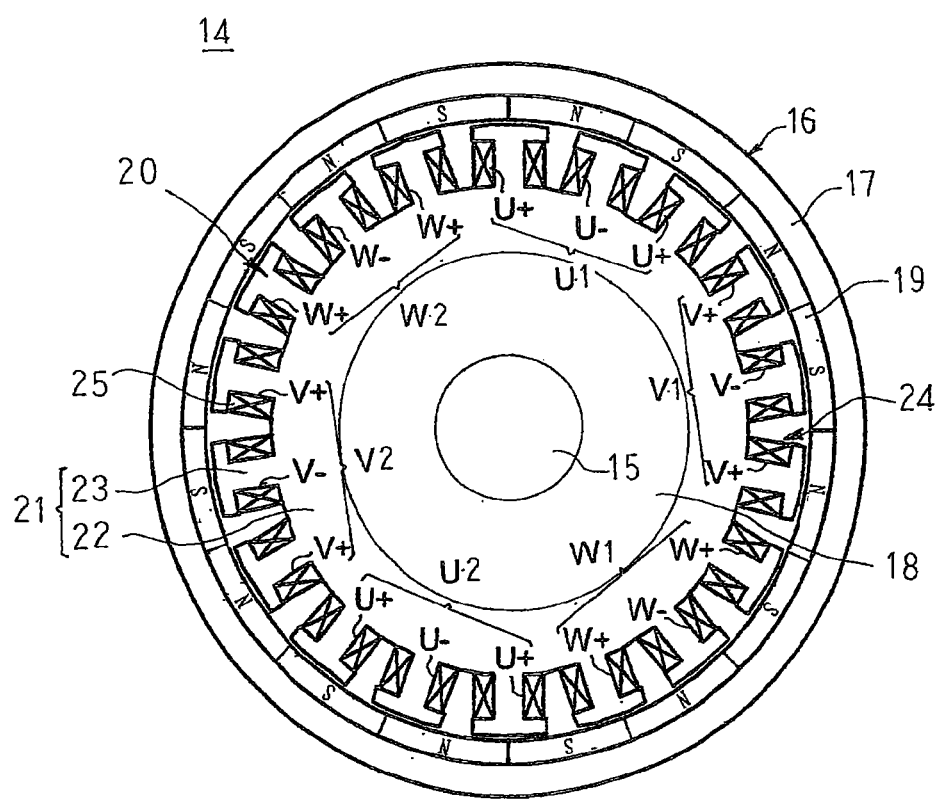
FIG. 2 It is a schematic diagram that explains a configuration of a motor that is used in the inverter-integrated driving module according to Embodiment 1 of the present invention.
Figure 3:
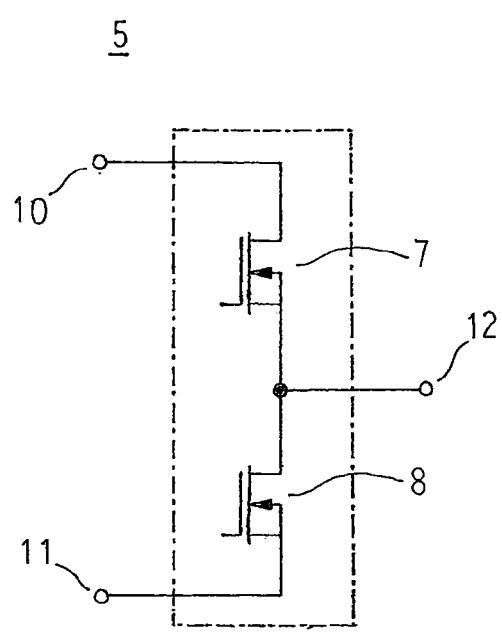
FIG. 3 It is a schematic diagram that explains a configuration of a 2-in-1 inverter unit that is used in the inverter-integrated driving module according to Embodiment 1 of the present invention.
Figure 4:
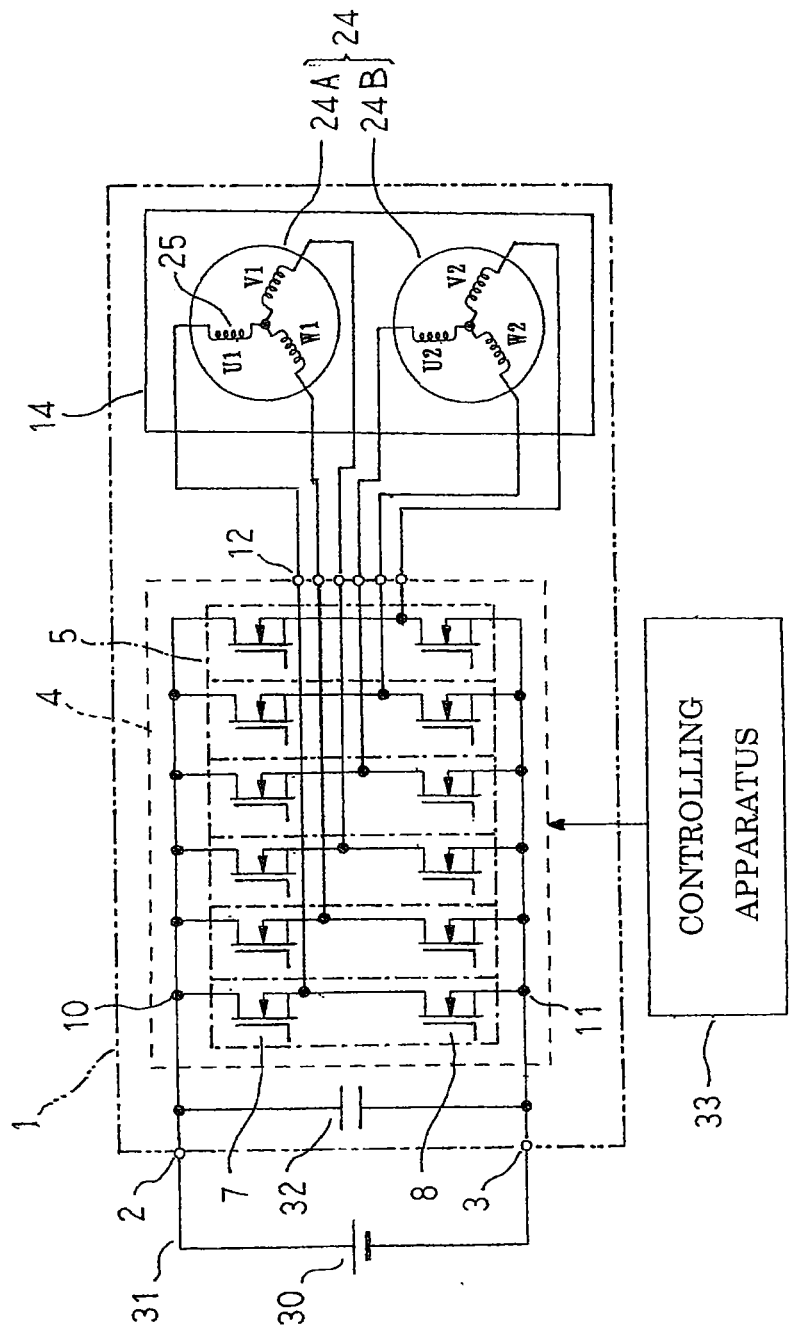
FIG. 4 It is a circuit diagram of the inverter-integrated driving module according to Embodiment 1 of the present invention.

FIG. 1 is an exploded perspective that shows an inverter-integrated driving module according to Embodiment 1 of the present invention, FIG. 2 is a schematic diagram that explains a configuration of a motor that is used in the inverter-integrated driving module according to Embodiment 1 of the present invention, FIG. 3 is a schematic diagram that explains a configuration of a 2-in-1 inverter unit that is used in the inverter-integrated driving module according to Embodiment 1 of the present invention, and FIG. 4 is a circuit diagram of the inverter-integrated driving module according to Embodiment 1 of the present invention.

In FIG. 1, an inverter-integrated driving module 1 includes: a positive electrode electric supply board 2 and a negative electrode electric supply board 3 that are connected to an external direct-current (DC) power supply to constitute a DC supply line; an inverter module 4 that converts the direct-current power that is supplied to the positive electrode electric supply board 2 and the negative electrode electric supply board 3 into alternating-current power; and a motor 14 that is driven to rotate by supplying thereto the alternating-current power that is converted by the inverter module 4.

The positive electrode electric supply board 2 and the negative electrode electric supply board 3 are each manufactured into a circular ring-shaped flat plate, and are disposed parallelly and coaxially so as to have a predetermined clearance to constitute parallel plate electrodes.

The inverter module 4 is configured by mounting six 2-in-1 inverter units 5 concyclically at a uniform angular pitch on a first surface of a circuit board 6. As shown in FIG. 3, the 2-in-1 inverter units 5 include an upper arm switching element 7, a lower arm switching element 8, a positive electrode input terminal 10, a negative electrode input terminal 11, and an alternating-current output terminal 12. The upper arm switching element 7 and the lower arm switching element 8 are resin-sealed by an insulating resin, a first end of the positive electrode input terminal 10 is connected to a positive-electrode side of the upper arm switching element 7 and is extended outward from the resin-sealed portion, a first end of the negative electrode input terminal 11 is connected to a negative-electrode side of the lower arm switching element 8 and is extended outward from the resin-sealed portion, and a first end of the alternating-current output terminal 12 is connected to a negative-electrode side of the upper arm switching element 7 and a positive-electrode side of the lower arm switching element 8 and is extended outward from the resin-sealed portion. Semiconductor switching elements such as metal-oxide-semiconductor field-effect transistors (MOSFETs), or insulated gate bipolar transistors (IGBTs), for example, can be used for the upper arm switching elements 7 and the lower arm switching elements 8. Moreover, although not shown, a heatsink is disposed on a second surface of the circuit board 6 so as to enable heat that is generated in the upper arm switching elements 7 and the lower arm switching elements 8 to be radiated effectively.

The motor 14 includes: a rotor 16 that is manufactured by pressing a magnetic material such as iron, for example, and has: a cylindrical rotor yoke portion 17; and a bottom surface portion 18 that extends inward from a first axial end of the rotor yoke portion 17, the bottom surface portion 18 being fixed to a shaft 15 at a central axial position of the rotor yoke portion 17; permanent magnets 19 that are fixed to an inner circumferential surface of the rotor yoke portion 17; and a stator 20 that has: a cylindrical stator core 21 that has: a stator yoke portion 22 that is manufactured into a cylindrical shape; and tooth portions 23 that are each disposed so as to project radially outward from an outer circumferential surface of the stator yoke portion 22, and that are arranged at a uniform angular pitch circumferentially; and a stator coil 24 that is wound onto the tooth portions 23.

The rotor 16 is manufactured by press-molding a magnetic material such as iron, for example, but it is not absolutely necessary for the bottom surface portion 18 to be a magnetic body. Specifically, it is sufficient that at least the rotor yoke portion 17 of the rotor 16 be manufactured using a magnetic material. A rotor 16 that is manufactured in this manner is configured so as to be rotatable by the shaft 15 being rotatably supported in a housing (not shown).

The permanent magnets 19 are sintered rare-earth magnets, for example. Sixteen permanent magnets 19 are arranged at a uniform angular pitch circumferentially such that North-seeking (N) poles and South-seeking (S) poles alternate, and are fixed to the inner circumferential surface of the rotor yoke portion 17.

The stator core 21 is manufactured, for example, by laminating magnetic steel sheets such that eighteen tooth portions 23 are disposed so as to project from an outer circumferential surface of the stator yoke portion 22. The stator coil 24 is constituted by six phase coils 25. Each of the phase coils 25 is configured by winding a single conductor wire a predetermined number of times onto one tooth portion 23, then winding it a predetermined number of times onto the next circumferentially adjacent tooth portion 23, and then winding it a predetermined number of times onto the next circumferentially adjacent tooth portion 23. In other words, each of the phase coils 25 is a concentrated winding coil that is configured by winding a single conductor wire consecutively onto three circumferentially adjacent tooth portions 23. Thus, as shown in FIG. 2, the six phase coils 25 are wound onto the stator core 21 so as to line up circumferentially in order of a U1 phase, a V1 phase, a W1 phase, a U2 phase, a V2 phase, and a W2 phase. Moreover, in FIG. 2, U+(V+, W+) and U−(V−, W−) indicate that the winding direction of the conductor wire relative to the tooth portion 23 that constitutes the U phase (V phase or W phase) is a reverse direction.

As shown in FIG. 4, a first three-phase alternating-current winding 24A that is constituted by star-connected coils is manufactured by connecting together (wye-connecting) winding finish end portions of three phase coils 25, namely the U1 phase, the V1 phase, and the W1 phase, and a second three-phase alternating-current winding 24B that is constituted by star-connected coils is manufactured by connecting together (wye-connecting) winding finish end portions of three phase coils 25, namely the U2 phase, the V2 phase, and the W2 phase.

As shown in FIG. 2, the motor 14 is configured into an outer-rotor three-phase motor in which the number of poles is sixteen and the number of slots is eighteen by fixing to a housing (not shown) a stator 20 that is manufactured in this manner so as to be disposed on an inner circumferential side of the rotor 16 so as to be coaxial to the shaft 15.

The inverter module 4 is manufactured so as to have an outside diameter that is approximately equal to the stator 20, and is configured such that radial positions of the 2-in-1 inverter units 5 are approximately equal to radial positions of the phase coils 25 in the stator 20. The inverter module 4 is fixed to the housing (not shown) so as to be disposed at a second axial end of the stator 20 in close proximity to the stator 20 so as to be coaxial to the shaft 15 such that the respective 2-in-1 inverter units 5 face each of the six phase coils 25 axially. In addition, the positive electrode electric supply board 2 and the negative electrode electric supply board 3 are disposed at a second axial end of the inverter module 4 in close proximity to the inverter module 4 so as to be coaxial to the shaft 15.

As shown in FIG. 4, in an inverter-integrated driving module 1 that is configured in this manner, the positive electrode electric supply board 2 and the negative electrode electric supply board 3 are connected to the external electric power supply 30 by means of the wiring 31, the positive electrode input terminals 10 of the six 2-in-1 inverter units 5 are connected to the positive electrode electric supply board 2, and the negative electrode input terminals 11 are connected to the negative electrode electric supply board 3. The respective alternating-current output terminals 12 of the six 2-in-1 inverter units 5 are connected to respective winding start end portions of the six phase coils 25. In addition, a smoothing capacitor 32 is connected in parallel to an input side of the inverter module 4 to absorb ripple currents and stabilize input voltage. Moreover, it is preferable to configure the wiring 31 using stranded wire so as to lower inductance.

In an inverter-integrated driving module 1 that is configured in this manner, ON/OFF switching of the upper arm switching elements 7 and the lower arm switching elements 8 of the six inverter units 5 is controlled by a controlling apparatus 33 such that direct-current power that is supplied from the electric power supply 30 is converted into alternating-current power and is supplied to the stator coil 25. A rotating magnetic field is thereby generated in the stator 20. Torque is generated by interaction between this rotating magnetic field of the stator 20 and the magnetic fields from the permanent magnets 19, driving the rotor 16 to rotate.

Because the electric power supply is direct current, this inverter-integrated driving module 1 can also be used in cases that use a plurality of motors, such as electric trains.

According to Embodiment 1, because the inverter module 4 is disposed in close proximity to the stator 20 so as to be coaxial to the shaft 15 such that the respective 2-in-1 inverter units 5 face each of the phase coils 25 axially, lengths of wiring that connects the 2-in-1 inverter units 5 and the stator coil 24 can be shortened. Thus, copper loss due to the wiring that connects the 2-in-1 inverter units 5 and the stator coil 24 can be reduced. In addition, since impedance of the wiring that connects the 2-in-1 inverter units 5 and the stator coil 24 is reduced, the capacity of the smoothing capacitor 32 can be reduced, enabling reductions in the size of the inverter-integrated driving module 1 to be achieved.

Because the 2-in-1 inverter units 5 are arranged concyclically at a uniform angular pitch, heat-generating parts are distributed circumferentially, reducing the density of generated heat. Thus, the 2-in-1 inverter units 5 can be cooled efficiently, enabling excessive temperature increases to be suppressed.

Because the first and second three-phase alternating-current windings 24A and 24B are configured by wye-connecting three phase coils 25, cyclic currents do not flow through the phase coils 25. Thus, copper loss due to cyclic currents is reduced, enabling increased efficiency.

Because the positive electrode electric supply board 2 and the negative electrode electric supply board 3 constitute parallel plate electrodes, the positive electrode electric supply board 2 and the negative electrode electric supply board 3 act as a smoothing capacitor, shown schematically in FIG. 4 as the smoothing capacitor 32. In addition, because the positive electrode electric supply board 2 and the negative electrode electric supply board 3 are disposed so as to be placed in close axial proximity to the inverter module 4, reductions in inductance can be achieved. Thus, looking at the system as a whole, because inductance is reduced, the smoothing capacitor 32 can be reduced in size, enabling system-wide reductions in size to be achieved.

Because the inductance is low, semiconductor switching elements that have silicon carbide (SiC) elements that enable high-frequency driving can be used in the upper arm switching elements 7 and the lower arm switching elements 8 instead of semiconductor switching elements that have silicon (Si) elements. Because silicon carbide (SiC) elements have low inductance, surge voltages can be suppressed. In that case, because the capacity of the smoothing capacitor 32 can be reduced for high-frequency driving, the smoothing capacitor 32 can be reduced in size, enabling further system-wide reductions in size to be achieved.

Now, in a comparative example in which twelve phase coils are wound onto a stator core 21 by winding a single conductor wire into a concentrated winding on each of the tooth portion 23 in order of a U phase, a V phase, a W phase, a U phase, a V phase, etc., circumferentially, for example, a U-phase coil is manufactured by connecting a winding finish end portion of a phase coil that is wound onto a first tooth portion 23 and a winding start end portion of a phase coil that is wound onto a fourth tooth portion 23, and by connecting a winding finish end portion of the phase coil that is wound onto the fourth tooth portion 23 and a winding start end portion of the phase coil that is wound onto a seventh tooth portion 23, a V-phase coil is manufactured by connecting a winding finish end portion of a phase coil that is wound onto a second tooth portion 23 and a winding start end portion of a phase coil that is wound onto a fifth tooth portion 23, and by connecting a winding finish end portion of the phase coil that is wound onto the fifth tooth portion 23 and a winding start end portion of the phase coil that is wound onto a eighth tooth portion 23, and a W-phase coil is manufactured by connecting a winding finish end portion of a phase coil that is wound onto a third tooth portion 23 and a winding start end portion of a phase coil that is wound onto a sixth tooth portion 23, and by connecting a winding finish end portion of the phase coil that is wound onto the sixth tooth portion 23 and a winding start end portion of the phase coil that is wound onto a ninth tooth portion 23. A first three-phase alternating-current winding is manufactured by connecting winding finish end portions of the U-phase coil, the V-phase coil, and the W-phase coil that are manufactured in this manner. Thus, seven connection points are required in the comparative example to constitute a first three-phase alternating-current winding that is equivalent to that of Embodiment 1.

In Embodiment 1, on the other hand, because the U-phase coil, the V-phase coil, and the W-phase coil are configured by winding a single conductor wire consecutively onto three circumferentially adjacent tooth portions 23, the first three-phase alternating-current winding 24A can be manufactured simply by connecting the winding finish end portions of the U-phase coil, the V-phase coil, and the W-phase coil. Thus, there is only a single connection point when configuring the first three-phase alternating-current winding 24A, enabling connection points to be reduced significantly. Because connection among the phase coils is a complicated operation in which the conductor wire is led onto an end surface of the stator core 21, significant reductions in connection points enable complicated connecting operations to be reduced, enabling cost reductions to be achieved. Moreover, significant reductions in connection points can similarly be made with regard to the second three-phase alternating-current winding 24B.

Moreover, in Embodiment 1 above, each of the phase coils is configured by winding a single conductor wire into a concentrated winding consecutively on three circumferentially adjacent tooth portions, but from the viewpoint of reducing the number of connections, each of the phase coils need only be configured by winding single conductor wire into concentrated windings consecutively on two or more circumferentially adjacent tooth portions.

In Embodiment 1 above, the stator coil is constituted by two three-phase alternating-current windings, but the stator coil may also be configured into a single three-phase alternating-current winding. In that case, U-phase, V-phase, and W-phase phase coils may also be configured by connecting in series identical-phase phase coils that are configured by winding a single conductor wire into a concentrated winding consecutively on three circumferentially adjacent tooth portions, or U-phase, V-phase, and W-phase phase coils may also be configured by winding a single conductor wire into concentrated windings consecutively on six circumferentially consecutive tooth portions. Then, the inverter module is configured such that three inverter units are disposed concyclically on the front surface of a board so as to face the U-phase, V-phase, and W-phase phase coils.

In Embodiment 1 above, a three-phase motor has been explained, but similar effects can also be achieved if the motor is a polyphase motor that has three or more phases, and particularly if it is a K-phase motor (where K is a prime number that is greater than or equal to 3).

Embodiment 2

Figure 5:
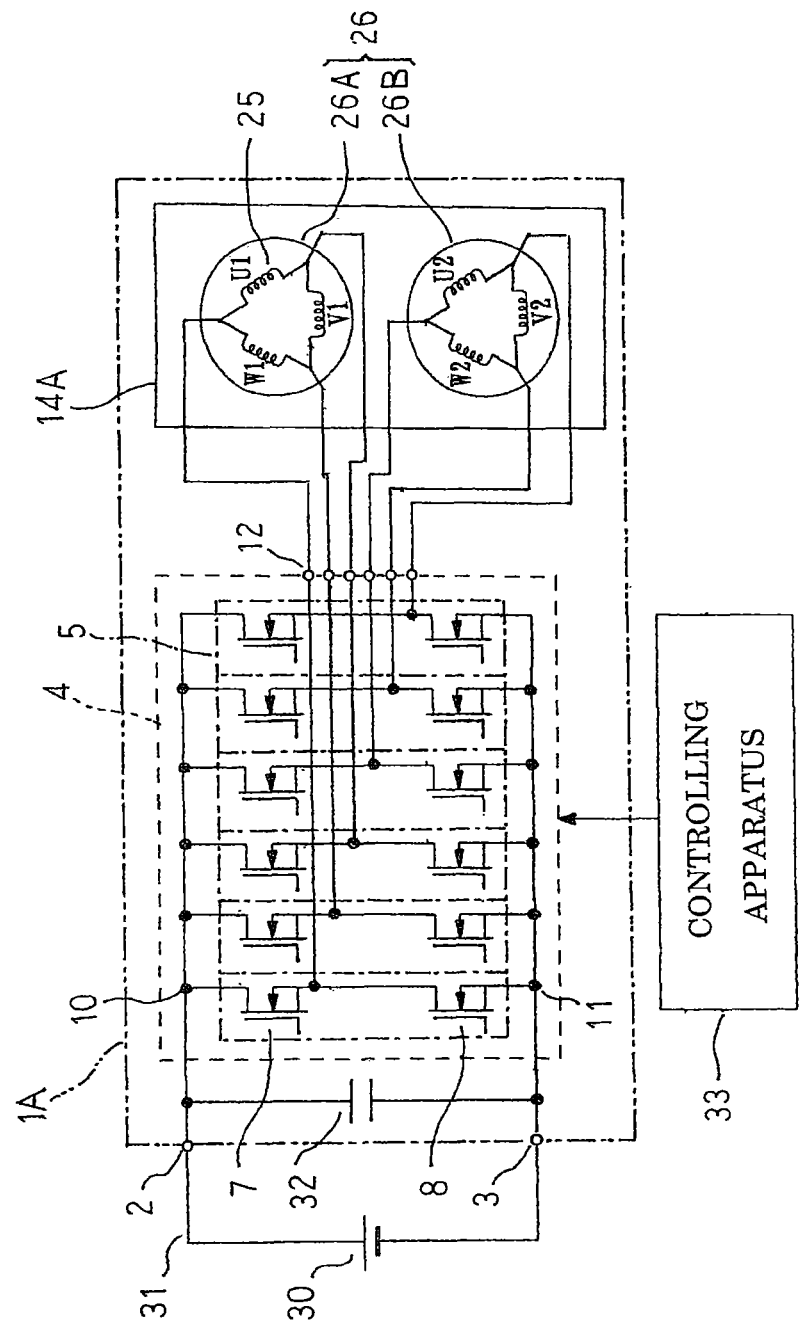
FIG. 5 It is a circuit diagram of the inverter-integrated driving module according to Embodiment 2 of the present invention.

FIG. 5 is a circuit diagram of the inverter-integrated driving module according to Embodiment 2 of the present invention.

In FIG. 5, a stator coil 26 is constituted by a first three-phase alternating-current winding 26A and a second three-phase alternating-current winding 26B that are each delta-connected. Specifically, the first three-phase alternating-current winding 26A is configured into a mesh-connected coil by connecting a winding finish end portion of a U1-phase phase coil 25 to a winding start end portion of a V1-phase phase coil 25, connecting a winding finish end portion of the V1-phase phase coil 25 to a winding start end portion of a W1-phase phase coil 25, and connecting a winding finish end portion of the W1-phase phase coil 25 to a U1-phase winding start end portion. Similarly, the second three-phase alternating-current winding 26B is configured into a mesh-connected coil by connecting a winding finish end portion of a U2-phase phase coil 25 to a winding start end portion of a V2-phase phase coil 25, connecting a winding finish end portion of the V2-phase phase coil 25 to a winding start end portion of a W2-phase phase coil 25, and connecting a winding finish end portion of the W2-phase phase coil 25 to a U2-phase winding start end portion.

Moreover, Embodiment 2 is configured in a similar or identical manner to that of Embodiment 1 above except that a motor 14A into which the stator coil 26 is mounted is used instead of the motor 14.

In an inverter-integrated driving module 1A that is configured in this manner, because the first and second three-phase alternating-current windings 26A and 26B that constitute the stator coil 26 are configured into mesh-connected coils, connection of a neutral point that is required in a wye connection is no longer required, enabling the connection points to be further reduced.

Embodiment 3

Figure 6:
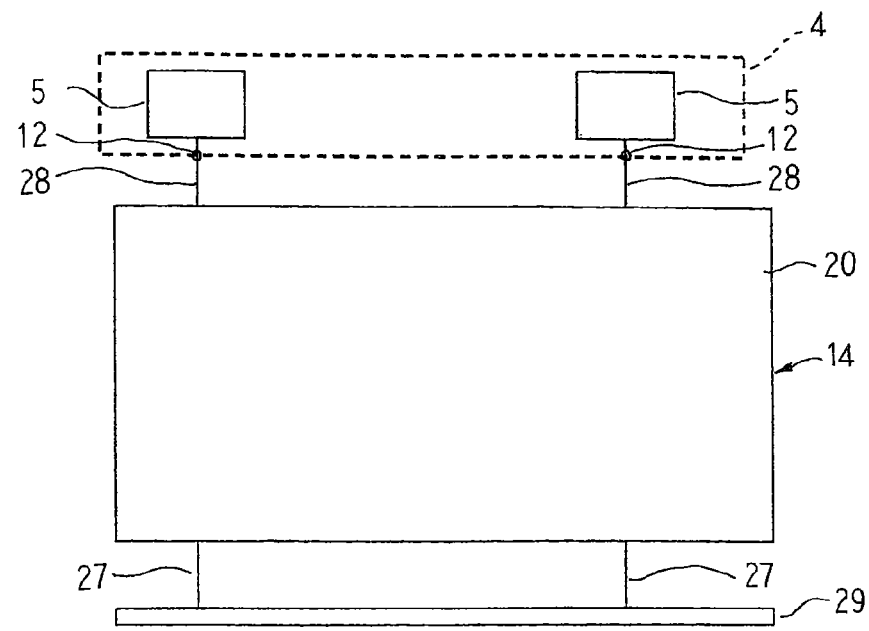
FIG. 6 It is a schematic diagram that explains a method for connecting a stator coil in an inverter-integrated driving module according to Embodiment 3 of the present invention.

FIG. 6 is a schematic diagram that explains a method for connecting a stator coil in an inverter-integrated driving module according to Embodiment 3 of the present invention. Moreover, a rotor is omitted from FIG. 6 in order to facilitate explanation.

In FIG. 6, a neutral-point lead wire 27 that is configured using winding finish portions of U1-phase, V1-phase, and W1-phase phase coils 25 that constitute a first three-phase alternating-current winding is led out at a first axial end of the stator 20, in addition, a neutral-point lead wire 27 that is configured using winding finish portions of U2-phase, V2-phase, and W2-phase phase coils 25 that constitute a second three-phase alternating-current winding is led out at the first axial end of the stator core 21, and is joined by solder, etc., to an annular linking body 29 that is made of an electrically-conductive material that is disposed at the first axial end of the stator 20. Output wires 28 that are configured using winding start portions of the U1-phase, V1-phase, W1-phase, U2-phase, V2-phase, and W2-phase phase coils 25 are led out near a second axial end of the stator 20, and are respectively joined by solder, etc., to alternating-current output terminals 12 of inverter units 5.

Moreover, the rest of the configuration is configured in a similar or identical manner to that of Embodiment 1 above.

According to Embodiment 3, the neutral-point lead wires 27 of the phase coils 25 are connected at the first axial end of the stator 20. Thus, because connecting wire portions between the output wires 28 of the phase coil 25 and the alternating-current output terminals 12 are distributed circumferentially at the second axial end of the stator 20, wiring lengths of the output wires 28 can be shortened, enabling reductions in inductance. Capacity of the smoothing capacitor 32 can thereby be further reduced, enabling reductions in size. In addition, because connection and disconnection between the inverter module 4 and the motor 14 is facilitated, the inverter module 4 and the motor 14 can be replaced easily when a failure occurs.

Embodiment 4

Figure 7:
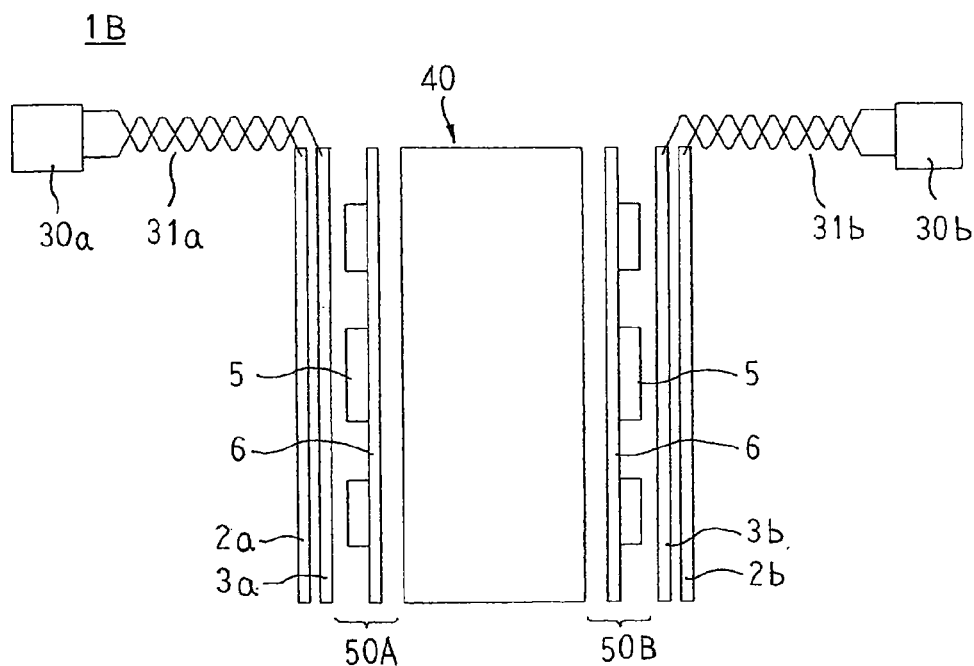
FIG. 7 It is a schematic diagram that explains a configuration of an inverter-integrated driving module according to Embodiment 4 of the present invention.
Figure 8:
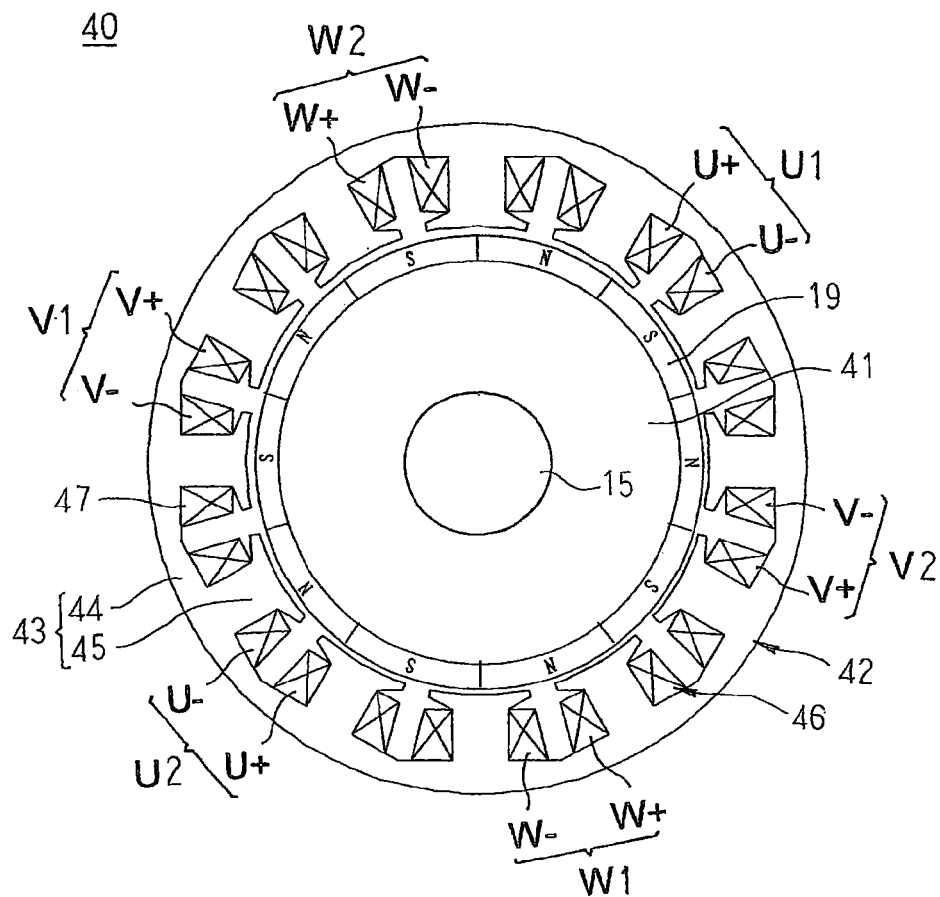
FIG. 8 It is a schematic diagram that explains a configuration of a motor that is used in the inverter-integrated driving module according to Embodiment 4 of the present invention.
Figure 9:
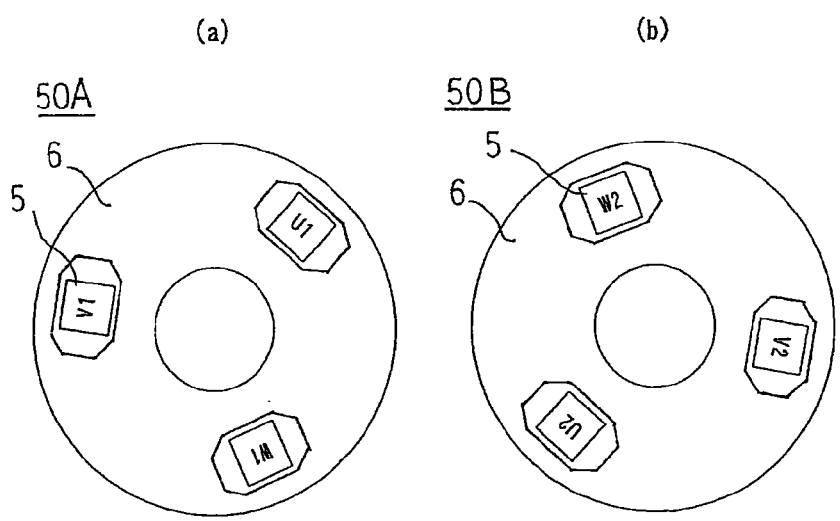
FIG. 9 It is a schematic diagram that explains arrangement of inverter units in inverter modules that are used in the inverter-integrated driving module according to Embodiment 4 of the present invention.
Figure 10:
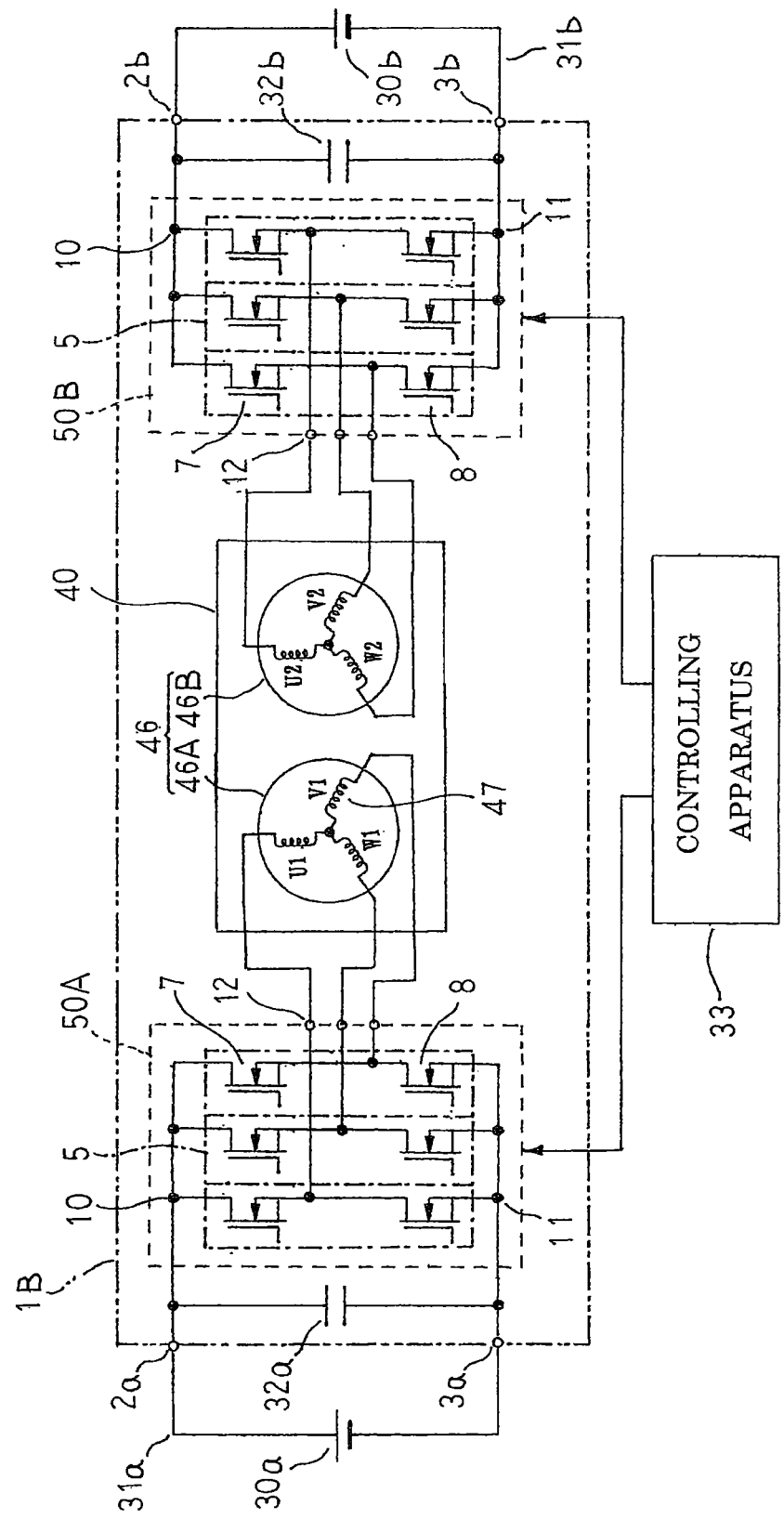
FIG. 10 It is a circuit diagram of the inverter-integrated driving module according to Embodiment 4 of the present invention.

FIG. 7 is a schematic diagram that explains a configuration of an inverter-integrated driving module according to Embodiment 4 of the present invention, FIG. 8 is a schematic diagram that explains a configuration of a motor that is used in the inverter-integrated driving module according to Embodiment 4 of the present invention, FIG. 9 is a schematic diagram that explains arrangement of inverter units in inverter modules that are used in the inverter-integrated driving module according to Embodiment 4 of the present invention, and FIG. 10 is a circuit diagram of the inverter-integrated driving module according to Embodiment 4 of the present invention.

In FIG. 7, an inverter-integrated driving module 1B includes: a motor 40; first and second inverter modules 50A and 50B that are disposed at two axial ends of the motor 40; a first parallel plate electrode that is constituted by a first positive electrode electric supply board 2a and negative electrode electric supply board 3a that are connected to an external electric power supply 30a to constitute a DC supply line; and a second parallel plate electrode that is constituted by a second positive electrode electric supply board 2b and negative electrode electric supply board 3b that are connected to an external electric power supply 30b to constitute a DC supply line.

As shown in FIG. 8, the motor 40 includes: a rotor 41 that is manufactured by laminating magnetic steel sheets such as iron, for example, into a cylindrical shape, and that is fixed to a shaft 15 that is inserted through a central axial position thereof; permanent magnets 19 that are fixed to an outer circumferential surface of the rotor 41; and a stator 42 that has: a cylindrical stator core 43 that has: a stator yoke portion 44 that is manufactured into a cylindrical shape; and tooth portions 45 that are each disposed so as to project radially inward from an inner circumferential surface of the stator yoke portion 44, and that are arranged at a uniform angular pitch circumferentially; and a stator coil 46 that is wound onto the tooth portions 45.

Ten permanent magnets 19 are arranged at a uniform angular pitch circumferentially such that North-seeking (N) poles and South-seeking (S) poles alternate, and are fixed to the outer circumferential surface of the rotor 41.

The stator core 43 is manufactured, for example, by laminating magnetic steel sheets such that twelve tooth portions 45 are disposed so as to project from an outer circumferential surface of the stator yoke portion 44. The stator coil 46 is constituted by six phase coils 47. Each of the phase coils 47 is configured by winding a single conductor wire a predetermined number of times onto one tooth portion 45, and then winding it a predetermined number of times in a reverse direction onto the next circumferentially adjacent tooth portion 45. In other words, each of the phase coils 47 is a concentrated winding coil that is configured by winding a single conductor wire consecutively onto two circumferentially adjacent tooth portions 45. Thus, as shown in FIG. 8, the six phase coils 47 are wound onto the stator core 43 so as to line up circumferentially in order of a U1 phase, a V2 phase, a W1 phase, a U2 phase, a V1 phase, and a W2 phase.

As shown in FIG. 10, a first three-phase alternating-current winding 46A that is constituted by star-connected coils is manufactured by connecting together winding finish end portions of three phase coils 47, namely the U1 phase, the V1 phase, and the W1 phase, and a second three-phase alternating-current winding 46B that is constituted by star-connected coils is manufactured by connecting together winding finish end portions of three phase coils 47, namely the U2 phase, the V2 phase and the W2 phase. Moreover, winding finish portions of the phase coils 47 form neutral-point lead wires, and winding start portions form output wires.

The motor 40 is configured into a 10-pole 12-slot inner-rotor three-phase motor by disposing the rotor 41 rotatably such that the shaft 15 is rotatably supported in a housing (not shown), and by fixing the stator 42 to the housing so as to be disposed so as to surround the rotor 41 and so as to be coaxial to the shaft 15.

The first inverter module 50A is configured by mounting three 2-in-1 inverter units 5 concyclically at a uniform angular pitch on a first surface of a circuit board 6. The first inverter module 50A is manufactured so as to have an outside diameter that is approximately equal to the stator 42, and is configured such that radial positions of the 2-in-1 inverter units 5 are approximately equal to radial positions of the phase coils 47 in the stator 42. The first inverter module 50A is fixed to the housing (not shown) so as to be disposed at a second axial end of the stator 42 in close proximity to the stator 42 so as to be coaxial to the shaft 15 such that the respective 2-in-1 inverter units 5 face the respective U1-phase, V1-phase, and W1-phase phase coils 47 axially. In addition, the first positive electrode electric supply board 2a and the first negative electrode electric supply board 3a are disposed at a second axial end of the first inverter module 50A in close proximity to the first inverter module 50A so as to be coaxial to the shaft 15.

The second inverter module 50B is configured by mounting three 2-in-1 inverter units 5 concyclically at a uniform angular pitch on a first surface of a circuit board 6. The second inverter module 50B is manufactured so as to have an outside diameter that is approximately equal to the stator 42, and is configured such that radial positions of the 2-in-1 inverter units 5 are approximately equal to radial positions of the phase coils 47 in the stator 42. The second inverter module 50B is fixed to the housing (not shown) so as to be disposed at a first axial end of the stator 42 in close proximity to the stator 42 so as to be coaxial to the shaft 15 such that the respective 2-in-1 inverter units 5 face the respective U2-phase, V2-phase, and W2-phase phase coils 47 axially. In addition, the second positive electrode electric supply board 2b and the second negative electrode electric supply board 3b are disposed at a first axial end of the second inverter module 50B in close proximity to the second inverter module 50B so as to be coaxial to the shaft 15.

As shown in FIG. 9, the 2-in-1 inverter units 5 in the first inverter module 50A and in the second inverter module 50B are arranged at a uniform angular pitch circumferentially so as to be offset by 60 degrees from each other.

As shown in FIG. 10, in an inverter-integrated driving module 1B that is configured in this manner, the first positive electrode electric supply board 2a and the first negative electrode electric supply board 3a are connected to the external electric power supply 30a by means of wiring 31a, the positive electrode input terminals 10 of three 2-in-1 inverter units 5 are connected to the first positive electrode electric supply board 2a, and the negative electrode input terminals 11 are connected to the first negative electrode electric supply board 3a. The respective alternating-current output terminals 12 of the three 2-in-1 inverter units 5 are connected to respective winding start end portions of three phase coils 47. In addition, a first smoothing capacitor 32a is connected in parallel to an input side of the first inverter module 50A.

In addition, the second positive electrode electric supply board 2b and the second negative electrode electric supply board 3b are connected to the external electric power supply 30b by means of wiring 31b, the positive electrode input terminals 10 of three 2-in-1 inverter units 5 are connected to the second positive electrode electric supply board 2b, and the negative electrode input terminals 11 are connected to the second negative electrode electric supply board 3b. The respective alternating-current output terminals 12 of the three 2-in-1 inverter units 5 are connected to respective winding start end portions of three phase coils 47. In addition, a second smoothing capacitor 32b is connected in parallel to an input side of the second inverter module 50B.

In an inverter-integrated driving module 1B that is configured in this manner, ON/OFF switching of the upper arm switching elements 7 and the lower arm switching elements 8 of the six inverter units 5 that constitute the first and second inverter modules 50A and 50B is controlled by a controlling apparatus 33 such that direct-current power that is supplied from the electric power supplies 30a and 30b is converted into alternating-current power and is supplied to the stator coil 46. A rotating magnetic field is thereby generated in the stator 42. Torque is generated by interaction between this rotating magnetic field of the stator 42 and the magnetic fields from the permanent magnets 19, driving the rotor 41 to rotate.

According to Embodiment 4, because the first and second inverter modules 50A and 50B are disposed in close proximity to the two axial ends of the motor 40 such that each of the 2-in-1 inverter units 5 face each of the phase coils 47 axially, and electric power is supplied to each of the two three-phase alternating current windings that constitute the stator coil 46, lengths of wiring that connects the 2-in-1 inverter units 5 and the stator coil 46 can be shortened. Thus, copper loss due to the wiring that connects the 2-in-1 inverter units 5 and the stator coil 46 can be reduced.

Because three 2-in-1 inverter units 5 are arranged concyclically at a uniform angular pitch in each of the first and second inverter modules 50A and 50B, heat-generating parts are further distributed circumferentially compared to Embodiment 1 above, reducing the density of generated heat even further. Thus, the heat that is generated in the 2-in-1 inverter units 5 is radiated efficiently, suppressing excessive temperature increases.

Because the first parallel plate electrode, which is constituted by the first positive electrode electric supply board 2a and the first negative electrode electric supply board 3a, is disposed in close proximity to the first inverter module 50A, and the second parallel plate electrode, which is constituted by the second positive electrode electric supply board 2b and the second negative electrode electric supply board 3b, is disposed in close proximity to the second inverter module 50B, lengths of wiring between the parallel plate electrodes and the first and second inverter modules 50A and 50B are shortened. Thus, inductance between first and second inverter modules 50A and 50B and the motor 40 is reduced, enabling electric current to be passed to the motor 40 without the phase of the electric current being delayed even when driven at high-frequencies.

Moreover, in Embodiment 4 above, electric power is supplied to each of the first and second inverter modules independently from two electric power supplies, but electric power may also be supplied to each of the first and second inverter modules by a single electric power supply.

In Embodiment 4 above, the two three-phase alternating current windings of the stator coil are each configured into a star-connected coil that is formed by wye-connecting (alternating-current connecting) three phase coils, but the two three-phase alternating current windings of the stator coil may also each be configured into a mesh-connected coil that is formed by delta-connecting (alternating-current connecting) three phase coils. In that case, because there is no neutral-point connection, connection and disconnection between the first and second inverter modules and the motor are facilitated. Thus, if the first and second inverter modules or the motor fails, the first and second inverter modules or the motor can be replaced easily.

In Embodiment 4 above, a 10-pole 12-slot inner-rotor three-phase motor is used, but the motor is not limited to a 10-pole 12-slot inner-rotor three-phase motor, provided that it is an inner-rotor three-phase motor in which the number of poles is 10N and the number of slots is 12N, or the number of poles is 14 N and the number of slots is 12N (where N is a positive integer).

Arrangement of inverter units in first and second inverter modules that are disposed at two axial ends of a 12N-slot (12±2)N-pole inner-rotor three-phase motors will now be explained.

Phase coils are configured by winding a conductor wire consecutively into a concentrated winding on two consecutive tooth portions. The phase coils are thereby arranged circumferentially such that sequences of a U1 phase, a V2 phase, a W1 phase, a U2 phase, a V1 phase, and a W2 phase are repeated for a total of N times. A first three-phase alternating-current winding is constituted by 3N U1-phase, V1-phase, and W1-phase phase coils, and a second three-phase alternating-current winding is constituted by 3N U2-phase, V2-phase, and W2-phase phase coils.

Here, if the N phase coils of identical phase are connected in series, then the three 2-in-1 inverter units of each of the first and second inverter modules are arranged circumferentially at a pitch of 120 degrees in a similar manner to Embodiment 4 above. The 2-in-1 inverter units in the first inverter module and the second inverter module are offset by 60 degrees from each other. In that case, the number of 2-in-1 inverter units is six, and the number of connections between the phase coils of identical phase when forming the first and second three-phase alternating-current windings is (N−1).

If the N phase coils in each of the phases are connected in parallel, then the 2-in-1 inverter units are disposed so as to face each of the phase coils axially, and electric power must be supplied to the identical-phase phase coils with identical timing. Thus, the 3N 2-in-1 inverter units of each of the first and second inverter modules are arranged circumferentially at a pitch of (360/3N) degrees. The 2-in-1 inverter units in the first inverter module and the second inverter module are offset by (60/N) degrees from each other. In that case, the number of 2-in-1 inverter units is 6N, and the number of connections between the phase coils of identical phase when forming the first and second three-phase alternating-current windings is zero.

Moreover, in a comparative example in which phase coils are configured by winding conductor wires into concentrated windings on single tooth portions, the phase coils are arranged circumferentially in sequences of a U1 phase, a V2 phase, a W1 phase, a U2 phase, a V1 phase, and a W2 phase so as to be repeated for a total of 2N times. A first three-phase alternating-current winding is constituted by 6N U1-phase, V1-phase, and W1-phase phase coils, and a second three-phase alternating-current winding is constituted by 6N U2-phase, V2-phase, and W2-phase phase coils.

In this comparative example, if the 2N phase coils of identical phase are connected in series, then the three 2-in-1 inverter units of each of the first and second inverter modules are arranged circumferentially at a pitch of 120 degrees. The 2-in-1 inverter units in the first inverter module and the second inverter module are offset by 60 degrees from each other. In that case, the number of 2-in-1 inverter units is six, but the number of connections between the phase coils of identical phase when forming the first and second three-phase alternating-current windings is (2N−1). Thus, the present application can significantly reduce the number of connections between the phase coils compared to the comparative example.

In this comparative example, if the 2N phase coils of identical phase in each of the phases are connected in parallel, then the 2-in-1 inverter units of each of the first and second inverter modules are disposed so as to face each of the phase coils axially, and electric power must be supplied to the identical-phase phase coils with identical timing. Thus, the 6N 2-in-1 inverter units of each of the first and second inverter modules are arranged circumferentially at a pitch of (360/6N) degrees. The 2-in-1 inverter units in the first inverter module and the second inverter module are offset by (30/N) degrees from each other. In that case, the number of connections between the phase coils of identical phase when forming the first and second three-phase alternating-current windings is zero, but the number of 2-in-1 inverter units is 12N. Thus, the present application can significantly reduce the number of 2-in-1 inverter units compared to the comparative example.

Next, a winding configuration of a stator coil in a 12N-slot (12±2)N-pole inner-rotor three-phase motor will be explained.

Phase coils are configured by winding a conductor wire consecutively into a concentrated winding on two consecutive tooth portions. The phase coils are thereby arranged circumferentially such that sequences of a U1 phase, a V2 phase, a W1 phase, a U2 phase, a V1 phase, and a W2 phase are repeated for a total of N times. Then, N three-phase alternating-current windings that are manufactured by connecting winding finish end portions of the U1-phase, V1-phase, and W1-phase phase coils, and N three-phase alternating-current windings that are manufactured by connecting winding finish end portions of the U2-phase, V2-phase, and W2-phase phase coils, are formed respectively. Thus, the stator coil is constituted by 2N three-phase alternating-current windings. The neutral points of the 2N three-phase alternating-current windings are not electrically connected to each other. In other words, the neutral points of the 2N three-phase alternating-current windings are separated from each other electrically. In addition, 2-in-1 inverter units are connected to each of the winding start end portions of the 6N phase coils.

Here, the 2N three-phase alternating-current windings that constitute the stator coil are each manufactured by wye-connecting phase coils in units of a/c poles and b/c slots, where a is the number of poles, b is the number of slots, and c the greatest common divisor of a and b. In other words, because this is a (12±2)N-pole 12N-slot three-phase motor, the respective three-phase alternating-current windings are manufactured by wye-connecting phase coils in units of (6±1) poles and six slots.

If the neutral points of the respective three-phase alternating-current windings are connected to each other electrically, there is a risk that cyclic currents may arise between identical phases due to irregularities in the resistance of the phase coils, irregularities in characteristics of the inverter elements, etc. In the present configuration, because the neutral points of the 2N three-phase alternating-current windings are separated from each other electrically, such cyclic currents do not arise.

If the neutral points of the respective three-phase alternating-current windings are connected to each other electrically, the motor cannot operate if a situation arises in which electric current cannot be passed through the phase coils of one of the three-phase alternating-current windings due to a ground fault, a bridging fault, etc. In the present configuration, because the neutral points of the 2N three-phase alternating-current windings are separated from each other electrically, problems in the phase coils of one of the three-phase alternating-current windings do not affect the phase coils of the other three-phase alternating-current windings, enabling operation of the motor.

In the present configuration, because the magnetic flux is closed in six-slot units, the stator can be assembled by linking 2N (=12N/6) segmented stators that are manufactured in six-slot units, facilitating preparation of the motor. The stator can be manufactured by the following three methods, for example.

In a first manufacturing method, a predetermined number of core segments that are punched from magnetic steel sheets, for example, are first laminated to manufacture segmented stator cores that have a shape in which an annular stator core is divided into 2N equal sections. Next, 2N segmented stators are manufactured by winding phase coils onto each two consecutive tooth portions of the segmented stator cores. Next, an annular stator core is manufactured by linking the segmented stator cores of the 2N segmented stators. The stator is then manufactured by connecting the neutral points of the phase coils using an annular connecting board.

In a second manufacturing method, a predetermined number of core segments that are punched from magnetic steel sheets, for example, are first laminated to manufacture segmented stator cores that have a shape in which a rectangular parallelepiped stator core is divided into 2N equal sections. Next, 2N segmented stators are manufactured by winding phase coils onto each two consecutive tooth portions of the segmented stator cores. Next, a rectangular parallelepiped stator core is manufactured by linking the segmented stator cores of the 2N segmented stators. Next, an annular stator core is manufactured by bending the rectangular parallelepiped stator core into an annular shape, and abutting and welding tip end portions. The stator is then manufactured by connecting the neutral points of the phase coils using an annular connecting board. Moreover, a "rectangular parallelepiped stator core" is an annular stator core that is cut and opened up and is spread into a single plane from a position at which a plane that includes a central axis intersects it.

In a third manufacturing method, a predetermined number of core segments that are punched from magnetic steel sheets, for example, are first laminated to manufacture segmented stator cores that have a shape in which an annular stator core is divided into 2N equal sections. Next, 2N segmented stators are manufactured by winding phase coils onto each two consecutive tooth portions of the segmented stator cores. Next, the neutral points of the phase coils of the segmented stators are connected using circular arc-shaped segmented connecting boards that are manufactured so as to correspond to six slots. An annular stator is then manufactured by linking the segmented stator cores of the 2N segmented stators in which the neutral points of the phase coils are connected.

In the present configuration, because the magnetic circuit is closed in six-slot units, as explained in the third manufacturing method, the phase coils that are wound into the segmented stator cores can be connected using 2N (=12N/6) circular arc-shaped segmented connecting boards that are manufactured so as to correspond to six slots. Because of this, the materials yield of the circuit boards is improved compared to when a single annular connecting board is used.

Moreover, in the first and second manufacturing methods, the phase coils are connected using an annular connecting board after the annular stator core is manufactured, but the phase coils may also be connected using segmented connecting boards instead of an annular connecting board.

Figure 11:
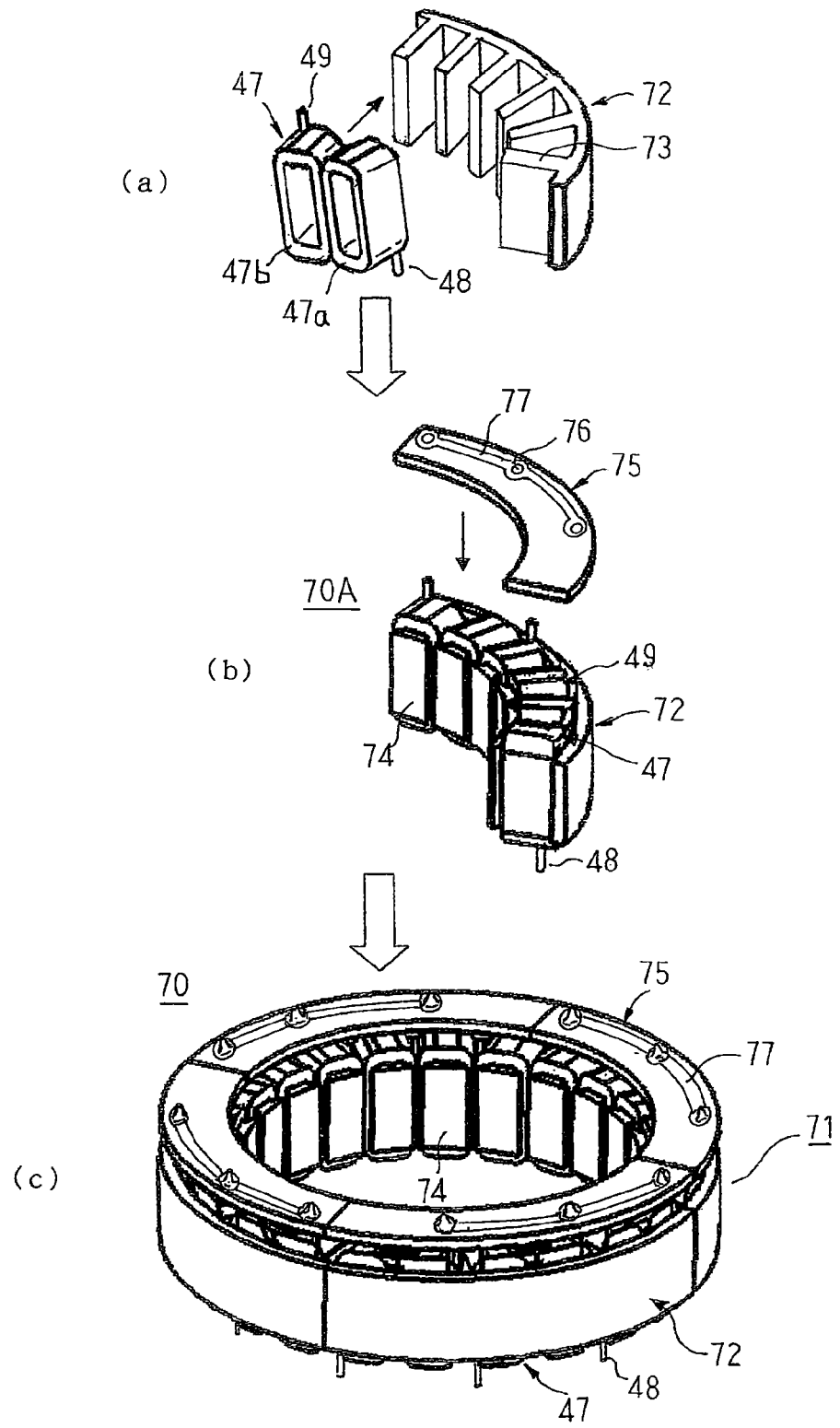
FIG. 11 It is a perspective that explains a method for manufacturing a stator of a 24-slot 20-pole three-phase motor that is used in an inverter-integrated driving module according to the present invention.

Next, the third manufacturing method will be explained in detail using FIG. 11. FIG. 11 is a perspective that explains a method for manufacturing a stator of a 24-slot 20-pole three-phase motor that is used in an inverter-integrated driving module according to the present invention.

As shown in FIG. 11(a), segmented stator cores 72 are first manufactured by laminating a predetermined number of core segments that are punched from magnetic steel sheets. These segmented stator cores 72 are manufactured into circular arc-shaped shapes in which an annular stator core 71 that has twenty-four tooth portions 73 is divided into four equal sections circumferentially. Next, phase coils 47 are mounted onto the respective tooth portions 73 of the segmented stator cores 72. The phase coils 47 are concentrated winding coils that are configured such that a first wound portion 47a is manufactured by winding a single conductor wire a predetermined number of times in a first direction and a second wound portion 47b is manufactured by subsequently winding the single conductor wire a predetermined number of times in a second direction. The first wound portion 47a and the second wound portion 47b are mounted onto respective adjacent tooth portions 73. Moreover, winding start end portions of the phase coils 47 project from the first wound portions 47a to constitute output wires 48, and winding finish end portions project from the second wound portions 47b to constitute neutral-point lead wires 49.

Next, tip ends of the tooth portions 73 are plastically deformed so as to project on first and second circumferential sides by pressing the tip ends of each of the tooth portions 73 from radially inside to manufacture the segmented stators 70A, as shown in FIG. 11(b). Flange portions 74 thereby extend from the tip ends of the tooth portions 73 on the first and second circumferential sides, preventing dislodging of the first wound portions 47a and the second wound portions 47b of the phase coils 47 from the tooth portions 73. The segmented stators 70A include the circular arc-shaped segmented stator cores 72, and the U-phase, V-phase, and W-phase phase coils 47 that are mounted onto each two adjacent tooth portions 73.

Next, as shown in FIG. 11(b), the neutral-point lead wires 49 of the U-phase, V-phase, and W-phase phase coils 47 are connected using segmented connecting boards 75 to form a single three-phase alternating-current winding. The segmented connecting boards 75 have a circular arc-shaped shape in which an annular connecting board is divided into four equal sections circumferentially, and are configured by forming three penetrating apertures 76 that correspond to the neutral-point lead wires 49, and wiring 77 that connects the penetrating apertures 76 electrically, on an insulating circuit board. The neutral-point lead wires 49 of the U-phase, V-phase, and W-phase phase coils 47 are inserted into the penetrating apertures 76, and are soldered to the wiring 77. The three phase coils 47 that are wound into the segmented stator core 72 are thereby wye-connected to configure a three-phase alternating-current winding.

Next, four segmented stator cores 72 are linked and integrated by placing end surfaces of the segmented stator cores 72 in contact with each other and joining them by welding, etc., to manufacture an annular stator core 71. As shown in FIG. 11(c), a stator 70 is thereby manufactured in which three-phase alternating-current windings are mounted onto each of the segmented stator cores 72.

In this case, the respective three-phase alternating-current windings are configured into star-connected coils in which the phase coils are wye-connected, but the respective three-phase alternating-current windings may also be configured into mesh-connected coils in which the phase coils are delta-connected. In that case, operation of the motor is enabled even if one three-phase alternating-current winding fails due to a ground fault or a bridging fault, etc.

If there is a difference in resistance between the coils that are wound onto each of the teeth, or if the timing of passage of electric current to each of the inverters is off, then cyclic currents arise between coils of identical phase when the coils of identical phase are connected in parallel, increasing copper loss, but if the neutral points are separated from each other electrically, such phenomena do not occur.

The neutral points of the respective three-phase alternating-current windings are separated from each other electrically, but the neutral points of the respective three-phase alternating-current windings may also be connected electrically. In that case, because the magnetic flux is closed in six-slot units, preparation of the motor is facilitated.

A 12N-slot (12±2)N-pole inner-rotor three-phase motor has been explained, but the present configuration can also be applied to a 12N-slot (12±2)N-pole outer-rotor three-phase motor.

In addition, in a motor in which a bearing is between the rotor and the inverter module, there is a bearing holding member. Generally, axial length of the motor is lengthened when there are segmented connecting boards, but increases in axial length can be suppressed without dividing the bearing holding member by embedding a portion or all of the segmented connecting boards in the bearing holding member.

Embodiment 5

Figure 12:
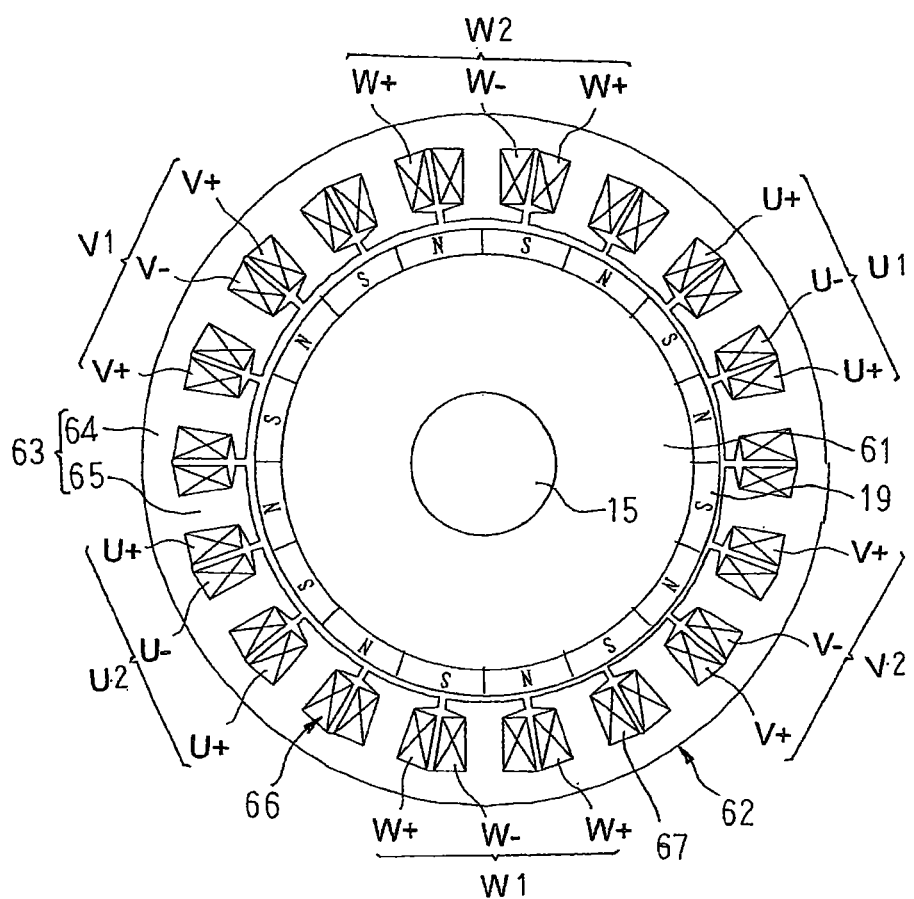
FIG. 12 It is a schematic diagram that explains a configuration of a motor that is used in the inverter-integrated driving module according to Embodiment 5 of the present invention.

FIG. 12 is a schematic diagram that explains a configuration of a motor that is used in the inverter-integrated driving module according to Embodiment 5 of the present invention.

In FIG. 12, a motor 60 includes: a rotor 61 that is manufactured by laminating magnetic steel sheets such as iron, for example, into a cylindrical shape, and that is fixed to a shaft 15 that is inserted through a central axial position thereof; permanent magnets 19 that are fixed to an outer circumferential surface of the rotor 61; and a stator 62 that has: a cylindrical stator core 63 that has: a stator yoke portion 64 that is manufactured into a cylindrical shape; and tooth portions 65 that are each disposed so as to project radially inward from an inner circumferential surface of the stator yoke portion 64, and that are arranged at a uniform angular pitch circumferentially; and a stator coil 66 that is wound onto the tooth portions 65.

Sixteen permanent magnets 19 are arranged at a uniform angular pitch circumferentially such that North-seeking (N)

poles and South-seeking (S) poles alternate, and are fixed to the outer circumferential surface of the rotor 61.

The stator core 63 is manufactured, for example, by laminating magnetic steel sheets such that eighteen tooth portions 65 are disposed so as to project from an outer circumferential surface of the stator yoke portion 64. The stator coil 66 is constituted by six phase coils 67. Each of the phase coils 67 is configured by winding a single conductor wire a predetermined number of times onto one tooth portion 65, then winding it a predetermined number of times in a reverse direction onto the next circumferentially adjacent tooth portion 65, and then winding it a predetermined number of times in a reverse direction onto the next circumferentially adjacent tooth portion 65. In other words, each of the phase coils 67 is a concentrated winding coil that is configured by winding a single conductor wire consecutively onto three circumferentially adjacent tooth portions 65. Thus, the six phase coils 67 are wound onto the stator core 63 so as to line up circumferentially in order of a U1 phase, a V2 phase, a W1 phase, a U2 phase, a V1 phase, and a W2 phase.

Although not shown, a first three-phase alternating-current winding that is constituted by star-connected coils is manufactured by connecting together winding finish end portions of three phase coils 67, namely the U1 phase, the V1 phase, and the W1 phase, and a second three-phase alternating-current winding that is constituted by star-connected coils is manufactured by connecting together winding finish end portions of three phase coils 67, namely the U2 phase, the V2 phase and the W2 phase.

The motor 60 is configured into a 16-pole 18-slot inner-rotor three-phase motor by disposing the rotor 61 rotatably such that the shaft 15 is rotatably supported in a housing (not shown), and by fixing the stator 62 to the housing so as to be disposed so as to surround the rotor 61 and so as to be coaxial to the shaft 15.

An inverter-integrated driving module according to Embodiment 5 is configured in a similar or identical manner to that of Embodiment 4 above except that the motor 60 is used instead of the motor 40.

Thus, the first positive electrode electric supply board 2*a* and the first negative electrode electric supply board 3*a* are connected to the external electric power supply 30*a* by means of wiring 31*a*, the positive electrode input terminals 10 of three 2-in-1 inverter units 5 are connected to the first positive electrode electric supply board 2*a*, and the negative electrode input terminals 11 are connected to the first negative electrode electric supply board 3*a*. The respective alternating-current output terminals 12 of the three 2-in-1 inverter units 5 are connected to respective winding start end portions of three phase coils 67. In addition, a first smoothing capacitor 32*a* is connected in parallel to an input side of the first inverter module 50A.

In addition, the second positive electrode electric supply board 2*b* and the second negative electrode electric supply board 3*b* are connected to the external electric power supply 30*b* by means of wiring 31*b*, the positive electrode input terminals 10 of three 2-in-1 inverter units 5 are connected to the second positive electrode electric supply board 2*b*, and the negative electrode input terminals 11 are connected to the second negative electrode electric supply board 3*b*. The respective alternating-current output terminals 12 of the three 2-in-1 inverter units 5 are connected to respective winding start end portions of three phase coils 67. In addition, a second smoothing capacitor 32*b* is connected in parallel to an input side of the second inverter module 50B.

Consequently, similar or identical effects to those in Embodiment 4 above are also exhibited in Embodiment 5.

Moreover, in Embodiment 5 above, electric power is supplied to each of the first and second inverter modules independently from two electric power supplies, but electric power may also be supplied to each of the first and second inverter modules by a single electric power supply.

In Embodiment 5 above, the two three-phase alternating current windings of the stator coil are each configured into a star-connected coil that is formed by wye-connecting (alternating-current connecting) three phase coils, but the two three-phase alternating current windings of the stator coil may also each be configured into a mesh-connected coil that is formed by delta-connecting (alternating-current connecting) three phase coils. In that case, because there is no neutral-point connection, connection and disconnection between the first and second inverter modules and the motor are facilitated. Thus, if the first and second inverter modules or the motor fails, the first and second inverter modules or the motor can be replaced easily.

In Embodiment 5 above, a 16-pole 18-slot inner-rotor three-phase motor is used, but the motor is not limited to a 16-pole 18-slot inner-rotor three-phase motor, provided that it is an inner-rotor three-phase motor in which the number of poles is 16N and the number of slots is 18N, or the number of poles is 20N and the number of slots is 18N (where N is a positive integer).

Arrangement of inverter units in first and second inverter modules that are disposed at two axial ends of an 18N-slot (18±2)N-pole inner-rotor three-phase motors will now be explained.

Phase coils are configured by winding a conductor wire consecutively into a concentrated winding on three consecutive tooth portions. The phase coils are arranged circumferentially such that sequences of a U1 phase, a V2 phase, a W1 phase, a U2 phase, a V1 phase, and a W2 phase are repeated for a total of N times. A first three-phase alternating-current winding is constituted by 3N U1-phase, V1-phase, and W1-phase phase coils, and a second three-phase alternating-current winding is constituted by 3N U2-phase, V2-phase, and W2-phase phase coils.

Here, if the N phase coils of identical phase are connected in series, then the three 2-in-1 inverter units of each of the first and second inverter modules are arranged circumferentially at a pitch of 120 degrees in a similar manner to Embodiment 5 above. The 2-in-1 inverter units in the first inverter module and the second inverter module are offset by 60 degrees from each other. In that case, the number of 2-in-1 inverter units is six, and the number of connections between the phase coils of identical phase when forming the first and second three-phase alternating-current windings is (N−1).

If the N phase coils in each of the phases are connected in parallel, then the 2-in-1 inverter units are disposed so as to face each of the phase coils axially, and electric power must be supplied to the identical-phase phase coils with identical timing. Thus, the 3N 2-in-1 inverter units of each of the first and second inverter modules are arranged circumferentially at a pitch of (360/3N) degrees. The 2-in-1 inverter units in the first inverter module and the second inverter module are offset by (60/N) degrees from each other. In that case, the number of 2-in-1 inverter units is 6N, and the number of connections between the phase coils of identical phase when forming the first and second three-phase alternating-current windings is zero.

Moreover, in a comparative example in which phase coils are configured by winding conductor wires into concentrated windings on single tooth portions, the phase coils are arranged circumferentially in sequences of a U1 phase, a V2 phase, a W1 phase, a U2 phase, a V1 phase, and a W2 phase so as to be repeated for a total of 3N times. A first three-phase alternating-current winding is constituted by 9N U1-phase, V1-phase, and W1-phase phase coils, and a second three-phase alternating-current winding is constituted by 9N U2-phase, V2-phase, and W2-phase phase coils.

In this comparative example, if the 3N phase coils of identical phase are connected in series, then the three 2-in-1 inverter units of each of the first and second inverter modules are arranged circumferentially at a pitch of 120 degrees. The 2-in-1 inverter units in the first inverter module and the second inverter module are offset by 60 degrees from each other. In that case, the number of 2-in-1 inverter units is six, but the number of connections between the phase coils of identical phase when forming the first and second three-phase alternating-current windings is (3N−1). Thus, the present application can significantly reduce the number of connections between the phase coils compared to the comparative example.

In this comparative example, if the 3N phase coils of identical phase in each of the phases are connected in parallel, then the 2-in-1 inverter units of each of the first and second inverter modules are disposed so as to face each of the phase coils axially, and electric power must be supplied to the identical-phase phase coils with identical timing. Thus, the 9N 2-in-1 inverter units of each of the first and second inverter modules are arranged circumferentially at a pitch of (360/9N) degrees. The 2-in-1 inverter units in the first inverter module and the second inverter module are offset by (20/N) degrees from each other. In that case, the number of connections between the phase coils of identical phase when forming the first and second three-phase alternating-current windings is zero, but the number of 2-in-1 inverter units is 18N. Thus, in the present application, the number of 2-in-1 inverter units can be reduced significantly compared to the comparative example.

Next, a winding configuration of a stator coil in an 18N-slot (18±2)N-pole inner-rotor three-phase motor will be explained.

Phase coils are configured by winding a conductor wire consecutively into a concentrated winding on three consecutive tooth portions. The phase coils are thereby arranged circumferentially such that sequences of a U1 phase, a V2 phase, a W1 phase, a U2 phase, a V1 phase, and a W2 phase are repeated for a total of N times. Then, N three-phase alternating-current windings that are manufactured by connecting winding finish end portions of the U1-phase, V1-phase, and W1-phase phase coils, and N three-phase alternating-current windings that are manufactured by connecting winding finish end portions of the U2-phase, V2-phase, and W2-phase phase coils, are formed respectively. Thus, the stator coil is constituted by 2N three-phase alternating-current windings. The neutral points of the 2N three-phase alternating-current windings are not electrically connected to each other. In other words, the neutral points of the 2N three-phase alternating-current windings are separated from each other electrically. In addition, 2-in-1 inverter units are connected to each of the winding start end portions of the 6N phase coils.

Here, the 2N three-phase alternating-current windings that constitute the stator coil are each manufactured by wye-connecting phase coils in units of a/c poles and b/c slots, where a is the number of poles, b is the number of slots, and c the greatest common divisor of a and b. In other words, in this example, because this is a (18±2)N-pole 18N-slot three-phase motor, the respective three-phase alternating-current windings are manufactured by wye-connecting phase coils in units of (9±1) poles and nine slots.

If the neutral points of the three-phase alternating-current windings are connected to each other electrically, there is a risk that cyclic currents may arise between identical phases due to irregularities in the resistance of the phase coils, irregularities in characteristics of the inverter elements, etc. In the present configuration, because the neutral points of the 2N three-phase alternating-current windings are separated from each other electrically, such cyclic currents do not arise.

If the neutral points of the three-phase alternating-current windings are connected to each other electrically, the motor cannot operate if a situation arises in which electric current cannot be passed through the phase coils of one of the three-phase alternating-current windings due to a ground fault, a bridging fault, etc. In the present configuration, because the neutral points of the 2N three-phase alternating-current windings are separated from each other electrically, problems in the phase coils of one of the three-phase alternating-current windings do not affect the phase coils of the other three-phase alternating-current windings, enabling operation of the motor.

In the present configuration, because the magnetic flux is closed in nine-slot units, the stator can be assembled by linking 2N (=18N/9) segmented stators that are manufactured in nine-slot units, facilitating preparation of the motor. The stator can be manufactured by the following three methods, for example.

In a first manufacturing method, a predetermined number of core segments that are punched from magnetic steel sheets, for example, are first laminated to manufacture segmented stator cores that have a shape in which an annular stator core is divided into 2N equal sections. Next, 2N segmented stators are manufactured by winding phase coils onto each three consecutive tooth portions of the segmented stator cores. Next, an annular stator core is manufactured by linking the segmented stator cores of the 2N segmented stators, and the stator is then manufactured by connecting the neutral points of the phase coils using an annular connecting board.

In a second manufacturing method, a predetermined number of core segments that are punched from magnetic steel sheets, for example, are first laminated to manufacture segmented stator cores that have a shape in which a rectangular parallelepiped stator core is divided into 2N equal sections. Next, 2N segmented stators are manufactured by winding phase coils onto each three consecutive tooth portions of the segmented stator cores. Next, a rectangular parallelepiped stator core is manufactured by linking the segmented stator cores of the 2N segmented stators. Next, an annular stator core is manufactured by bending the rectangular parallelepiped stator core into an annular shape, and abutting and welding tip end portions, and the stator is then manufactured by connecting the neutral points of the phase coils using an annular connecting board. Moreover, a "rectangular parallelepiped stator core" is an annular stator core that is cut and opened up and is spread into a single plane from a position at which a plane that includes a central axis intersects it.

In a third manufacturing method, a predetermined number of core segments that are punched from magnetic steel sheets, for example, are first laminated to manufacture segmented stator cores that have a shape in which an annular stator core is divided into 2N equal sections. Next, 2N segmented stators are manufactured by winding phase coils onto each three consecutive tooth portions of the segmented stator cores. Next, the neutral points of the phase coils of the segmented stators are connected using circular arc-shaped segmented connecting boards that are manufactured so as to correspond to nine slots. An annular stator is then manufactured by linking the segmented stator cores of the 2N segmented stators in which the neutral points of the phase coils are connected.

In the present configuration, because the magnetic circuit is closed in nine-slot units, as explained in the third manufacturing method, the phase coils that are wound into the segmented stator can be connected using 2N (=18N/9) circular arc-shaped segmented connecting boards that are manufactured so as to correspond to nine slots. Because of this, the materials yield of the circuit boards is improved compared to when a single annular connecting board is used.

Moreover, in the first and second manufacturing methods, the phase coils are connected using an annular connecting board after the annular stator core is manufactured, but the phase coils may also be connected using segmented connecting boards instead of an annular connecting board.

In this case, the respective three-phase alternating-current windings are configured into star-connected coils in which the phase coils are wye-connected, but the respective three-phase alternating-current windings may also be configured into mesh-connected coil in which the phase coils are delta-connected. In that case, operation of the motor is enabled even if one three-phase alternating-current winding fails due to a ground fault or a bridging fault, etc.

If there is a difference in resistance between the coils that are wound onto each of the teeth, or if the timing of passage of electric current to each of the inverters is off, then cyclic currents arise between coils of identical phase when the coils of identical phase are connected in parallel, increasing copper loss, but if the neutral points are separated from each other electrically, such phenomena do not occur.

The neutral points of the respective three-phase alternating-current windings are separated from each other electrically, but the neutral points of the respective three-phase alternating-current windings may also be connected electrically. In that case, because the magnetic flux is closed in nine-slot units, preparation of the motor is facilitated.

A 18N-slot (18±2)N-pole inner-rotor three-phase motor has been explained, but the present configuration can also be applied to a 18N-slot (18±2)N-pole outer-rotor three-phase motor.

In addition, in a motor in which a bearing is between the rotor and the inverter module, there is a bearing holding member. Generally, axial length of the motor is lengthened when there are segmented connecting boards, but increases in axial length can be suppressed without dividing the bearing holding member by embedding a portion or all of the segmented connecting boards in the bearing holding member.

Moreover, in each of the above embodiments, the inverter units are configured by connecting upper arm switching elements and lower arm switching elements in series, but a diode that supplies return current to the motor, which is an inductive load, may be additionally connected in parallel to each of the upper arm switching elements and lower arm switching elements.

In each of the above embodiments, the inverter unit is constituted by single upper arm switching elements and single lower arm switching elements, but an inverter unit may also be constituted by a plurality of upper arm switching elements that are connected to each other in parallel and a plurality of lower arm switching elements that are connected to each other in parallel.

The invention claimed is:
1. An inverter-integrated driving module comprising:
a motor comprising:
  a stator including a stator coil that is constituted by M phase coils, where M is an integer that is greater than or equal to 3; and
  a rotor rotatably disposed about an axis in said stator;
parallel plate electrodes acting as a smoothing capacitance and having a ring structure, said parallel plate electrodes being constituted by a positive electrode electric supply board and an negative electrode electric supply board; and
an inverter module axially interposed between said parallel plate electrodes and said motor, said inverter module comprising a circuit board and M phase inverter units circumferentially disposed around a peripheral region of the circuit board,
wherein said inverter module has opposed sides, including a first side axially facing and connected to the motor and an opposite second side axially facing and connected to the parallel plate electrodes, said parallel plate electrodes axially facing and completely covering the inverter module disposed around the peripheral region of the circuit board;
each of said M phase coil comprises a concentrated winding coil in which a conductor wire is would into a concentrated winding consecutively on L circumferentially consecutive tooth portions, where L is an integer than is greater than or equal to 2;
said inverter module includes a plurality of inverter units disposed so as to be axially adjacent and facing respective of said M phase coils such that radial positions of the plurality of inverter units are approximately equal to radial positions of said M phase coils in said direction of an axis of said stator;
said stator comprises am annular stator core;
said rotor has magnetic poles in which North-seeking poles and South-seeking poles are arranged so as to alternate circumferentially; and
said inverter module comprises said plurality of inverter units each comprising,
  a positive electrode-side input terminal,
  a negative electrode-side input terminal,
  an upper arm switching element of which a positive-electrode side is connected to said positive electrode-side input terminal,
  a lower arm switching element of which a negative-electrode side is connected to said negative electrode-side input terminal, and
  an alternating-current output terminal that is connected to a negative-electrode side of said upper arm switching element and a positive-electrode side of said lower arm switching element;
wherein:
each of said plurality of inverter units of said inverter module is disposed in close proximity to said motor so as to face each of said M phase coils axially;
said parallel plate electrodes each comprise a circular ring-shaped flat plate, arranged so as to face said inverter module axially in close proximity thereto, and supply electric power to said plurality of inverter units;
smoothing capacitor is connected in parallel to an input side of said inverter module; and
said motor and said inverter module are electrically connected by connecting said alternating-current out- put terminals of each of said plurality of inverter units to output wires of said phase coils that face said inverter units axially, said inverter-integrated driving module comprising:
said motor being an inner-rotor three-phase motor having 12N slots and 12N±2N poles, where N is an integer greater than or equal to 1, and said M phase coils comprising 6N concentrated winding coils that are each manufactured by winding a conductor wire into a concentrated winding consecutively on two circumferentially consecutive tooth portions;

said stator coil comprising,
a first three-phase alternating-current winding that is manufactured by alternating-current connecting three first phase coil groups that are each constituted by connecting N of said concentrated winding coils of identical phase in parallel, and a second three-phase alternating-current winding that is manufactured by alternating-current connecting three second phase coil groups that are each constituted by connecting N of said concentrated winding coils of identical phase in parallel;

said inverter module comprising,
a first inverter module comprising 3N of said inverter units, that is disposed at said second axial end of said motor such that said inverter units face each of said concentrated winding coils that constitute said three first phase coil groups axially, and in which each of said alternating-current output terminals of said inverter units is connected to said axially facing concentrated winding coil, and a second inverter module comprising 3N of said inverter units, that is disposed at said first axial end of said motor such that said inverter units face each of said concentrated winding coils that constitute said three second phase coil groups axially, and in which each of said alternating-current output terminals of said inverter units is connected to said axially facing concentrated winding coil; and said parallel plate electrodes comprising,
a first smoothing capacitor comprising first parallel plate electrodes disposed on an opposite side of said first inverter module from said motor so as to face said first inverter module axially in close proximity thereto, and that supplies electric power to said 3N inverter units of said first inverter module, and a second smoothing capacitor comprising second parallel plate electrodes disposed on an opposite side of said second inverter module from said motor so as to face said second inverter module axially in close proximity thereto, and that supplies electric power to said 3N inverter units of said second inverter module;

wherein
said first smoothing capacitor is connected in parallel to an input side of said first inverter module, and
said second smoothing capacitor is connected in parallel to an input side of second inverter module.

2. An inverter-integrated driving module according to claim 1, wherein said 3N inverter units of said first inverter module are arranged concyclically at a uniform angular pitch, and said 3N inverter units of said second inverter module are arranged concyclically at a uniform angular pitch so as to be each offset circumferentially by 60/N degrees relative to said inverter units of said first inverter module.

3. An inverter-integrated driving module comprising:
a motor comprising:
a stator including a stator coil that is constituted by M phase coils, where M is an integer that is greater than or equal to 3; and
a rotor rotatably disposed about an axis in said stator;
parallel plate electrodes acting as a smoothing capacitance and having a ring structure, said parallel plate electrodes being constituted by a positive electrode electric supply board and an negative electrode electric supply board; and an inverter module axially interposed between said parallel plate electrodes and said motor, said inverter module comprising a circuit board and M phase inverter units circumferentially disposed around a peripheral region of the circuit board, wherein said inverter module has opposed sides, including a first side axially facing and connected to the motor and an opposite second side axially facing and connected to the parallel plate electrodes, said parallel plate electrodes axially facing and completely covering the inverter module disposed around the peripheral region of the circuit board;

each of said M phase coil comprises a concentrated winding coil in which a conductor wire is would into a concentrated winding consecutively on L circumferentially consecutive tooth portions, where L is an integer than is greater than or equal to 2;

said inverter module includes a plurality of inverter units disposed so as to be axially adjacent and facing respective of said M phase coils such that radial positions of the plurality of inverter units are approximately equal to radial positions of said M phase coils in said direction of an axis of said stator;

said stator comprises am annular stator core; said rotor has magnetic poles in which North-seeking poles and South-seeking poles are arranged so as to alternate circumferentially; and said inverter module comprises said plurality of inverter units each comprising,
a positive electrode-side input terminal,
a negative electrode-side input terminal,
an upper arm switching element of which a positive-electrode side is connected to said positive electrode-side input terminal,
a lower arm switching element of which a negative-electrode side is connected to said negative electrode-side input terminal, and
an alternating-current output terminal that is connected to a negative-electrode side of said upper arm switching element and a positive-electrode side of said lower arm switching element;

wherein:
each of said plurality of inverter units of said inverter module is disposed in close proximity to said motor so as to face each of said M phase coils axially;

said parallel plate electrodes each comprise a circular ring-shaped flat plate, arranged so as to face said inverter module axially in close proximity thereto, and supply electric power to said plurality of inverter units;

smoothing capacitor is connected in parallel to an input side of said inverter module; and said motor and said inverter module are electrically connected by connecting said alternating-current output terminals of each of said plurality of inverter units to output wires of said phase coils that face said inverter units axially, said inverter-integrated driving module comprising:

said motor being an inner-rotor three-phase motor having 18N slots and 18N±2N poles, where N is an integer greater than or equal to 1, and said M phase coils comprising 6N concentrated winding coils that are each manufactured by winding a conductor wire into a concentrated winding consecutively on three circumferentially consecutive tooth portions;

said stator coil comprising, a first three-phase alternating-current winding that is manufactured by alternating-current connecting three first phase coil groups that are each constituted by connecting N of said concentrated winding coils of identical phase in parallel, and a second three-phase alternating-current winding that is manufactured by alternating-current connecting three second phase coil groups that are each constituted by connecting N of said concentrated winding coils of identical phase in parallel;

said inverter module comprising, a first inverter module comprising 3N of said inverter units, that is disposed at said second axial end of said motor such that said inverter units face each of said concentrated winding coils that constitute said three first phase coil groups axially, and in which each of said alternating-current output terminals of said inverter units is connected to said axially facing concentrated winding coil, and a second inverter module comprising 3N of said inverter units, that is disposed at said first axial end of said motor such that said inverter units face each of said concentrated winding coils that constitute said three second phase coil groups axially, and in which each of said alternating-current output terminals of said inverter units is connected to said axially facing concentrated winding coil; and said parallel plate electrodes comprising, a first smoothing capacitor comprising first parallel plate electrodes disposed on an opposite side of said first inverter module from said motor so as to face said first inverter module axially in close proximity thereto, and that supplies electric power to said 3N inverter units of said first inverter module, and a second smoothing capacitor comprising second parallel plate electrodes disposed on an opposite side of said second inverter module from said motor so as to face said second inverter module axially in close proximity thereto, and that supplies electric power to said 3N inverter units of said second inverter module wherein said first smoothing capacitor is connected in parallel to an input side of said first inverter module, and said second smoothing capacitor is connected in parallel to an input side of second inverter module.

4. An inverter-integrated driving module according to claim 3, wherein said 3N inverter units of said first inverter module are arranged concyclically at a uniform angular pitch, and said 3N inverter units of said second inverter module are arranged concyclically at a uniform angular pitch so as to be each offset circumferentially by 60/N degrees relative to said inverter units of said first inverter module.

* * * * *